United States Patent Office
3,307,832
Patented Mar. 7, 1967

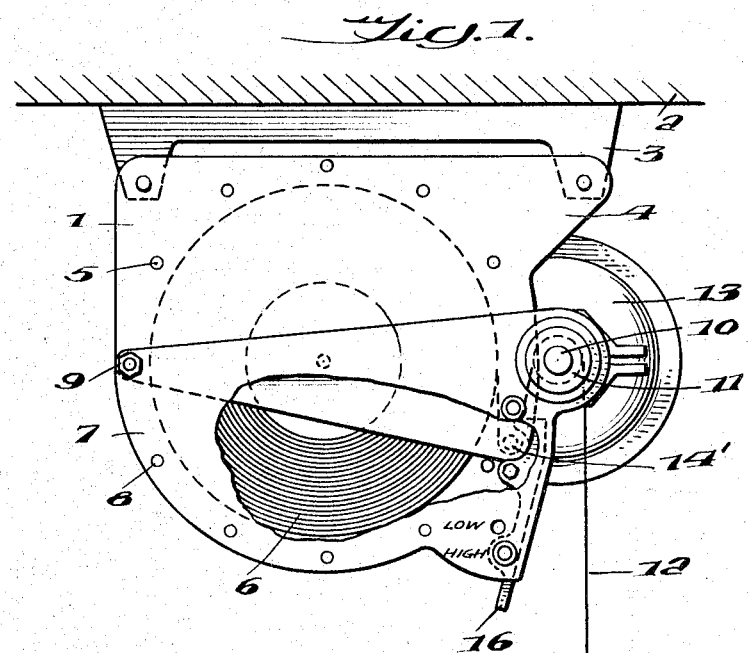
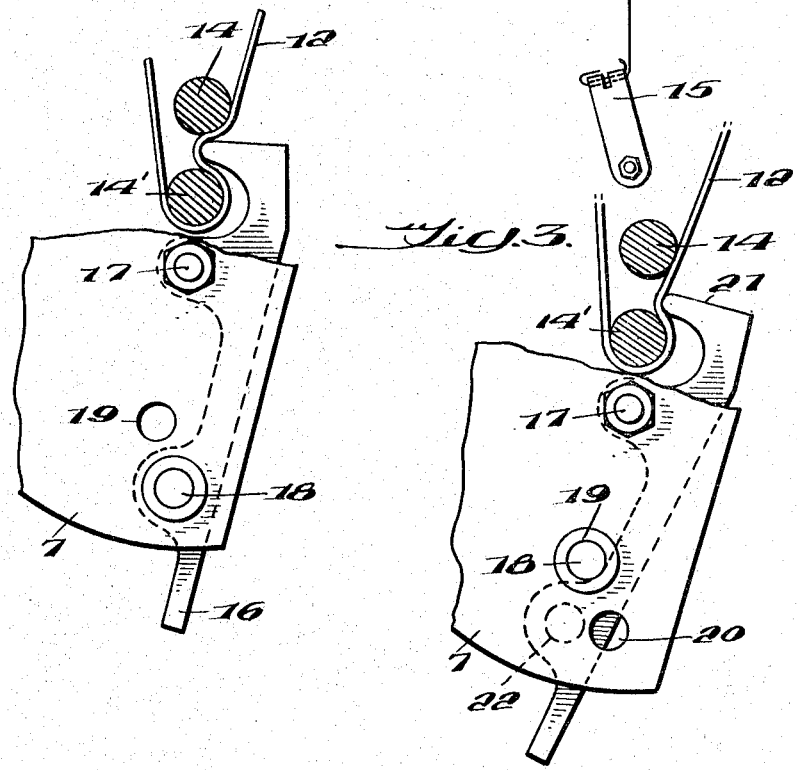

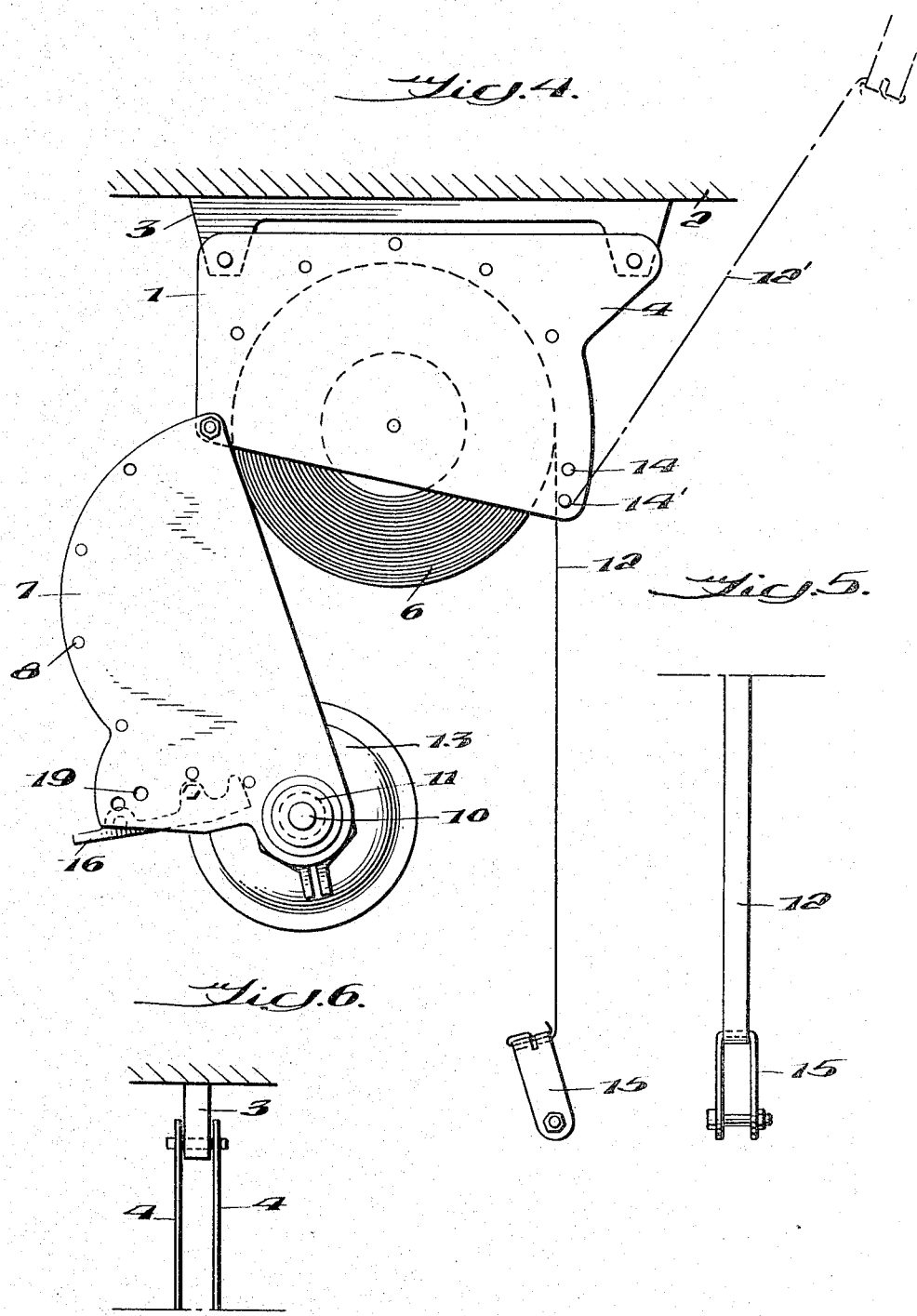

3,307,832
CARGO LOWERING DEVICE
Willem D. Van Zelm, Ruxton, and Martin A. Jackson, Bradshaw, Md.; said Jackson assignor to Van Zelm Associates Inc., Baltimore, Md., a corporation of Maryland; said Van Zelm assignor to Entwistle Manufacturing Corporation, Providence, R.I.
Filed Mar. 1, 1965, Ser. No. 436,089
3 Claims. (Cl. 254—156)

This invention relates to a cargo lowering device, more particularly a device for lowering or dropping cargo or personnel at a controlled rate of descent.

In dropping or lowering cargo in any gravity actuated device, there is always the problem of the load being accelerated to the point of damaging the load upon impact against the ground at too high a velocity. Since the height from which the drop starts, as for example in unloading cargo from a helicopter over a drop-zone, the free fall or substantially free fall may be injurious to the load.

It is an object of this invention to provide a device whereby a load of a predetermined amount can be lowered from altitude at a controlled rate of descent.

It is another object of this invention to provide a device which will lower a cargo from altitude and free the cargo after contact with the ground.

It is another object of this invention to provide a light weight, gravity operated cargo lowering device in which the cargo is lowered at a substantially constant velocity.

Further and other objects will become apparent from the description of the accompanying drawings in which like numerals refer to like parts.

In the drawings:

FIGURE 1 is an elevational view partly in section showing the device installed on, for example, a helicopter.

FIGURES 2 and 3 are enlarged fragmentary views partly in section showing the selective operation of the cargo device.

FIGURE 4 is an elevational view of the device, in the open position to show the coil of metal tape in place within the container illustrating the reloading provisions.

FIGURE 5 is a side elevation of the strap and end fitting.

FIGURE 6 is a fragmentary end view showing the device mounted on the aircraft.

In FIGURE 1, the cargo lowering device 1 is shown attached to supporting structure, such as an aircraft or helicopter 2, by means of a mounting base member which comprises a bracket 3 secured to helicopter 2 and a pair of spaced plates 4 secured together by fasteners such as bolts or rivets 5. The space between the pair of plates 4 affords a cavity into which is inserted a coiled metal element 6 which can be in the form of a flat metal tape or a metal rod or bar which will be hereinafter referred to as a metal element. A pair of plates 7 is also spaced and held in a spaced relationship by fastening devices 8. A bolt 9 hinges the two pairs of plates 4 and 7 so that they may be swung as shown in FIGURE 4 to permit the insertion of the coil of the metal element. The side of the pair of plates 7 opposite the hinge is formed to afford a bearing for shaft 10. A pulley-like member 11 is mounted on shaft 10, which has the outer surface thereof engaged by metal element 12, knurled or grooved to prevent slippage. A velocity sensitive energy absorbing device 13 is mounted on shaft 10 and moves with any motion of the pulley-like member 11. The velocity sensitive energy absorber can be any of the well known types where the movement of the shaft 10 moves the mechanism of device 13 so that any tendency to accelerate the rotation of the shaft is resisted by device 13. Such a device generally has a rotor encased in the housing which moves in a mass of steel shot or a viscous fluid to resist acceleration.

The pair of plates 4 has mounted on the side opposite the hinge point, a pair of bolts extending through the pair of side plates 4 which can be of any form to, in effect, provide rod-like members around which the metal element passes. Bolts 14 and 14' may be of any contour as long as they present to the metal element a smooth, curved surface which the metal element contacts. As will be seen in FIGURE 4, coil 6 of metal element 12 is inserted between the pair of plates 4. The metal element is bent upwardly to the position shown at 12'. Before the bottom portion, comprising pairs of plates 7, is moved into position and locked by placing a pin, bolt or rod-like member 14 through holes formed in pairs of plates 4 and 7, the metal element 12 is moved downwardly and is positioned over pulley-like member 11. The fitting 15 can be of any shape to engage metal element 12 and afford a support for a load.

A lever 16 is pivotally mounted at 17 between pairs of plates 7. A pin 18 is passed through holes 19 in pairs of plates 7, and as shown in FIGURE 3, affords the stop for the lever in one position. The opposite end of the lever has end 21 formed with a smooth generally cylindrical surface and the end of lever 16 is formed so that end 21 extends into the space between rod-like members 14 and 14' to a greater or lesser degree as lever 16 is moved counterclockwise. For larger loads a plurality of pins or rod-like members may be employed, in which case portion 21 of lever 16 will be a detent means that will depress the metal element between adjacent rod-like members.

In the position shown in FIGURE 3, portion 21 of lever 16 extends slightly into the space between rod-like members 14 and 14' so that metal element 12 is slightly deformed as it passes around members 14, 14' and 21.

When pin 18 is moved from holes 19 and passed through holes 20 formed in pairs of plates 7 and holes 22 in lever 16, portion 21 of lever 16 extends farther into the space between rod-like members 14, 14' for greater deformation of element 12.

When lever 16 is in the position shown in FIGURE 3, there will be less energy absorbed by element 12 as the load moves downwardly and moves element 12 through the lowering device.

When lever 16 is in the position shown in FIGURE 2, a greater load will be lowered by element 12 at a predetermined substantially constant rate of speed.

There are several parameters that may be varied, depending upon the load to be handled by the load or cargo lowering device. The energy absorbed by the metal element 12 supporting the load depends upon the kinetic energy that is absorbed by the bending of metal element 12 as it passes around rod-like members 14, 14' and portion 21 of lever 16. As the bends in metal element 12 are increased, a greater amount of energy is absorbed by the progressive and successive deformation of metal element 12. It will be seen therefore that by increasing or decreasing the diameter of members 14, 14' and the radius of curvature of portion 21 of lever 16, as well as the spacing of members 14, 14' and portion 21, a greater or less degree of bending of metal element 12 is effected. With the same geometry of structure, metal element 12 can be made of harder material or thicker material or of a greater width, in other words a greater cross-sectional area, all of which parameters increase the load which may be lowered by the device. For a predetermined load to be lowered, it is necessary to have selected the proper parameters to give an exerted force slightly less than the load to be lowered by the device. For a predetermined load to be lowered, it is necessary to have selected the proper parameters to give an exerted force slightly less than the load to be lowered by the device. To effect the purpose of lowering such a load at a substantially constant speed, the selected metal element is then passed over pulley-like member 14 so that any tendency to accelerate, due to the excess of load over the energy absorption in metal element 12, is retarded by the velocity sensitive device 13. By the proper selection of parameters for the load, a substantially constant speed lowering device is obtained.

In one of the applications, the device of this invention is mounted on a helicopter which is intended to lower a load or personnel from the hovering helicopter. Metal element 12 would be approximately one hundred and fifty feet long. It would be placed in the lowering device and the load attached. The load would be of a predetermined amount and by moving lever 16 to one of two positions indicated on FIGURE 1 as "high" load or "low" load, the degree of flexibility can be obtained for one set of parameters and geometry of the device, to provide for the low load position satisfactory operation with a load between two hundred and four hundred pounds. With lever 16 moved to the high load position, satisfactory operation can be had with a load between four hundred and five hundred pounds. With the proper positioning of lever 16, the predetermined load will be lowered with the helicopter hovering over the drop area at about one hundred feet. The load moves to the ground at a constant velocity of a small enough magnitude that the load will not be damaged on impact with the ground. When the load has touched the ground the helicopter will climb and the metal element will run out of the device and free the load from the helicopter. Another metal element coil can be placed in the device and quickly put in position to lower successive loads in the same manner.

It is to be understood that certain changes, alterations, modifications and substitutions can be made in this invention without departing from the spirit and scope of the depending claims.

We claim:

1. A cargo lowering device comprising a metal tape having an end portion formed into a coil, a storage container for the coil of said metal tape mounted on a base member, a metal bender energy absorbing means, and a velocity sensitive energy absorbing device mounted on said base member having a pulley-like member rotatably driven by said tape during extraction of the tape from said coil for resisting acceleration of the pulley-like member, said metal bender energy absorbing means comprising a pair of spaced rod-like members having parallel axes extending transversely of the path of said tape around both of which said tape makes a single pass before passing over said pulley-like member to support a load to be lowered, a load selective control member mounted on said base member, one end of said control member formed with an edge having a cylindrical face formed about an axis extending substantially parallel with the axes of said rod-like members, and means supporting said control member at a position disposing said face in bending engagement with the tape in the space between said rod-like members for progressively and successively deforming increments of the tape beyond the elastic limit of the metal a predetermined amount depending upon the weight to be dropped as the tape is extracted during the drop, to partially absorb the energy of the drop.

2. A load lowering device comprising a metal element having an end portion formed into a coil, a storage container for the coil of said metal element mounted on a base member, a metal bender energy absorbing means, and a velocity sensitive energy absorbing device mounted on said base member having a pulley-like member rotatably driven by said element during extraction of the metal element from said coil for resisting acceleration of the pulley-like member, said metal bender energy absorbing means including metal deforming means engaging said metal element between said coil and said pulley-like member and progressively and successively bending increments of the metal element beyond the elastic limit thereof during extraction of the metal element from the coil to thereby absorb a portion of the load energy by the plastic deformation of the metal element, and said metal element passing over said pulley-like member in rotary driving relation thereto to support a load to be lowered, said velocity sensitive energy absorber including means mounted on the shaft of said pulley which absorbs the torque generated in said shaft in excess of that required to lower the load at a predetermined velocity.

3. A load lowering device comprising a metal element having an end portion formed into a coil, a storage container for the coil of said metal element mounted on a base member, a metal bender energy absorbing means, and a velocity sensitive energy absorbing device mounted on said base member having a pulley-like member rotatably driven by said element during extraction of the metal element from said coil for resisting acceleration of the pulley-like member, said metal bender energy absorbing means comprising a pair of spaced rod-like members extending transversely of the path of said element around both of which said element makes a single pass before passing over said pulley-like member to support a load to be lowered, a load selective control lever mounted on said base member pivoted on a pivot axis approximately paralleling said transverse rod-like members, one end of said control lever formed with a laterally extending offset terminating in an edge having a cylindrical face formed about an axis extending parallel with the axis of said rod-like members, and means supporting said lever in a plurality of positions in each of which confronting surface portions of said face and said rod-like members engage said element and bend it by pressing said element into the space between said two-rod-like members to progressively bend increments of the metal element during extraction thereof from the coil beyond the elastic limit thereof a predetermined amount depending upon the weight to be dropped.

References Cited by the Examiner
UNITED STATES PATENTS

| 194,228 | 8/1877 | Eichler | 254—152 X |
|---|---|---|---|
| 260,722 | 7/1882 | Willson | 254—156 X |
| 288,304 | 11/1883 | Burks | 254—156 |
| 306,843 | 10/1884 | Lindop | 254—156 |
| 503,322 | 8/1893 | Jones | 254—156 |
| 930,580 | 8/1909 | Weinstock | 254—156 |
| 1,296,052 | 3/1919 | Dietz | 254—157 |
| 2,585,876 | 2/1952 | Thoennes | 254—190 X |

SAMUEL F. COLEMAN, *Primary Examiner.*